(12) United States Patent
Daum et al.

(10) Patent No.: US 8,030,431 B2
(45) Date of Patent: Oct. 4, 2011

(54) HARDENABLE CYANATE COMPOSITIONS

(75) Inventors: Ulrich Daum, Hofstetten (CH); Alessandro Falchetto, Domodossola (IT); Sajal Das, Bedminster, NJ (US)

(73) Assignee: Lonza AG, Basel (CH)

( * ) Notice: Subject to any disclaimer, the term of this patent is extended or adjusted under 35 U.S.C. 154(b) by 0 days.

(21) Appl. No.: 10/492,789

(22) PCT Filed: Oct. 18, 2002

(86) PCT No.: PCT/EP02/11662
§ 371 (c)(1),
(2), (4) Date: Apr. 16, 2004

(87) PCT Pub. No.: WO03/035718
PCT Pub. Date: May 1, 2003

(65) Prior Publication Data
US 2004/0254329 A1    Dec. 16, 2004

Related U.S. Application Data

(60) Provisional application No. 60/330,424, filed on Oct. 22, 2001.

(30) Foreign Application Priority Data

Oct. 19, 2001 (EP) .................................. 01124967

(51) Int. Cl.
C08G 59/02    (2006.01)
C08G 59/40    (2006.01)
C08G 59/50    (2006.01)
C08G 73/06    (2006.01)

(52) U.S. Cl. ......... 528/121; 528/124; 528/418; 528/422

(58) Field of Classification Search .................. 528/418, 528/422, 121, 124
See application file for complete search history.

(56) References Cited

U.S. PATENT DOCUMENTS

| 4,680,378 A | 7/1987 | Hefner |
| 5,003,039 A | 3/1991 | Keller |
| 5,043,411 A | 8/1991 | Ho et al. |
| 5,206,321 A * | 4/1993 | Hefner et al. .................. 526/256 |
| 5,371,178 A | 12/1994 | Nguyen |
| 5,494,981 A | 2/1996 | Gorodisher et al. |
| 2002/0095007 A1 * | 7/2002 | Larock et al. .................. 524/310 |

FOREIGN PATENT DOCUMENTS

GB    1055524    *    1/1967
WO    93-17059          9/1993

OTHER PUBLICATIONS

The International Search Report from corresponding PCT application.
Takeji, Patent Abstracts of Japan abstracting JP 62-252417.

* cited by examiner

*Primary Examiner* — Jeffrey Mullis
(74) *Attorney, Agent, or Firm* — Fisher, Christen & Sabol

(57) ABSTRACT

A curable mixture which includes at least (a) 10 to 100 percent by weight, in relation to the sum of the components (a) and (b), of at least one bi- or polyfunctional aromatic cyanate or a prepolymer formed from at least one bi- or polyfunctional aromatic cyanate or a mixture formed from the abovementioned cyanates and/or prepolymers; (b) 0 to 90 percent by weight, in relation to the sum of the components (a) and (b), of at least one mono-, bi- or polyfunctional epoxy resin; (c) 0.5 to 30 percent by weight, in relation to the sum of the components (a) and (b), of at least one mono-, bi- or polyfunctional aromatic amine; and (d) 0 to 5 percent by weight, in relation to the sum of the components (a) and (b), of at least one catalyst from the group consisting of transition metal compounds and boron trihalides.

33 Claims, No Drawings

HARDENABLE CYANATE COMPOSITIONS

This is a 371 national stage application of International Patent Application No. PCT/EP02/11662, filed on Oct. 18, 2002, that has priority benefit of both European Patent Application No. 01124967.9, filed on Oct. 19, 2001 and U.S. Provisional Application No. 60/330,424, filed on Oct. 22, 2001.

The invention relates to curable mixtures formed from aromatic cyanates or cyanate/epoxide mixtures, aromatic amines and optionally catalysts for the preparation of polytriazine-based thermosetting materials. It additionally relates to the thermosetting substances obtainable by curing these mixtures and to their use in the preparation of molded items.

The polytriazines obtainable from bi- or polyfunctional aromatic cyanates and the thermosetting materials obtainable from the abovementioned cyanates and epoxy resins are valuable materials because of their outstanding heat-resistance and good dielectric properties. In each case, the term polyfunctional cyanates, polyfunctional epoxides or polyfunctional amines is understood to mean, here and subsequently, compounds comprising three or more cyanate, epoxy or amino groups in a molecule.

It is true that it is also possible to cure the abovementioned starting materials by a purely thermal route but the curing is usually carried out by addition of catalytically effective transition metal compounds, such as, for example, cobalt or copper acetylacetonate or zinc octanoate ("zinc octoate"). However, because of their toxicity and/or danger to the environment (in particular in the disposal of materials prepared with them), and the possible influencing of the electrical and magnetic properties, these are per se undesirable.

It was accordingly an object of the present invention to make available alternative additives for the curing of aromatic cyanates and cyanate/epoxide mixtures which do not exhibit the abovementioned disadvantages.

This object is achieved according to the invention by the curable mixtures as of the invention. It has been found surprisingly that, by the use of aromatic amines as curing agent of bi- or polyfunctional cyanates or their mixtures with epoxides, not only can catalysts comprising heavy metals be dispensed with but also products with outstanding properties are obtained after curing. Thus, the glass transition temperature ($T_g$) in particular is markedly increased and the cured products exhibit an improved impact strength. In addition, the through-curing is improved and the curing pattern, in particular the latency in the curing, is improved.

The curable mixtures according to the invention comprise at least the following constituents:
(a) 10 to 100% by weight, in relation to the sum of the components (a) and (b), of at least one bi- or polyfunctional aromatic cyanate or a prepolymer formed from at least one bi- or polyfunctional aromatic cyanate or a mixture formed from the abovementioned cyanates and/or prepolymers,
(b) 0 to 90% by weight, in relation to the sum of the components (a) and (b), of at least one mono-, bi- or polyfunctional epoxy resin,
(c) 0.5 to 30% by weight, in relation to the sum of the components (a) and (b), of at least one mono-, bi- or polyfunctional aromatic amine, and
(d) 0 to 5% by weight, in relation to the sum of the components (a) and (b), of at least one catalyst from the group consisting of transition metal compounds and boron trihalides.

Transition metal compounds are to be understood as meaning both salts and coordination compounds, the transition metals in particular being able to be first row and second-row transition metals. This includes, for example, coordination compounds, such as cobalt or copper acetylacetonate, or salts, such as zinc octanoate or zinc stearate.

Boron trihalides are in particular boron trifluoride and boron trichloride.

Use is preferably made, as bi- or polyfunctional aromatic cyanates, of those from the group consisting of the compounds of the general formulae

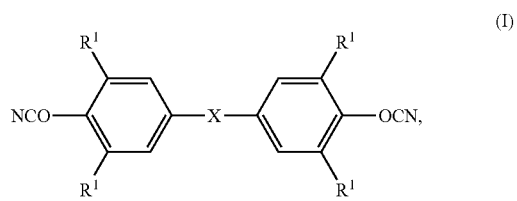

in which $R^1$ is hydrogen, methyl or bromine and X is a divalent organic radical chosen from the group consisting of —CH$_2$—, —CH(CH$_3$)—, —C(CH$_3$)$_2$—, —C(CF$_3$)$_2$—, —O—, —S—, —SO$_2$—, —C(=O)—, —OC(=O)—, —OC(=O)O— and

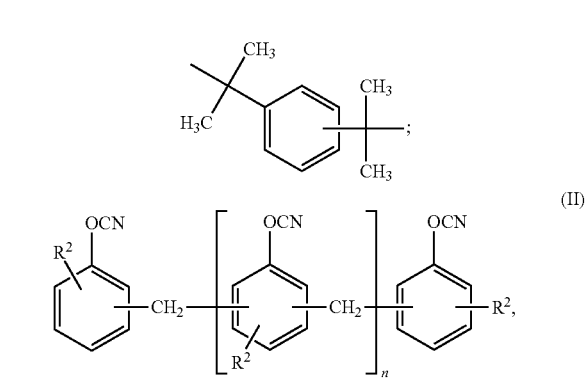

in which n is a number from 0 to 10 and $R^2$ is hydrogen or methyl; and

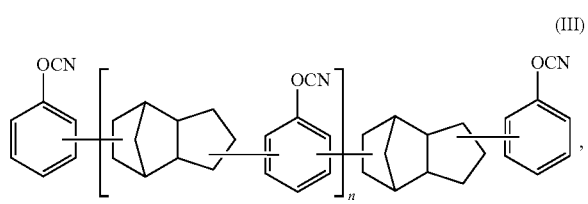

in which n has the abovementioned meaning. Mixtures of these compounds, prepolymers of these compounds, prepolymers formed from mixtures of these compounds and mixtures formed from prepolymers of these compounds can likewise also be used. Prepolymers are to be understood as the oligomers obtainable by partial trimerization. These comprise both triazine groups produced by trimerization and unreacted cyanate groups. The cyanates are known compounds and are in many cases available commercially; likewise, the prepolymers are known and are in some cases available commercially or can be readily prepared from the cyanates.

Use is preferably made, as epoxy resins, of those from the group consisting of the compounds of the general formulae

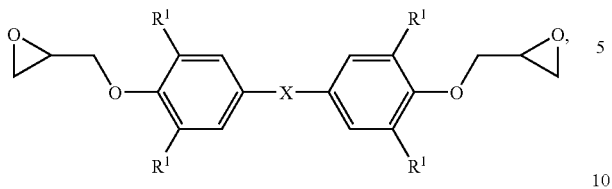

(IV)

in which $R^1$ and X have the abovementioned meanings, and the corresponding oligomers;

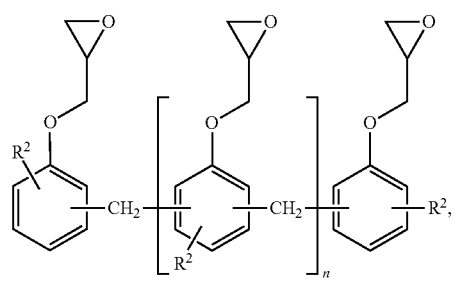

(V)

in which n and $R^2$ have the abovementioned meanings: and

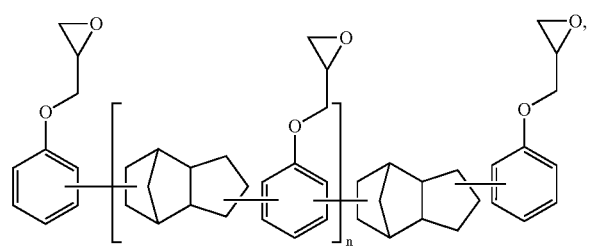

(VI)

in which n has the abovementioned meaning. These compounds are also known and are available commercially from various manufacturers.

Use is preferably made, as aromatic amines, of those from the group consisting of the compounds of the general formulae

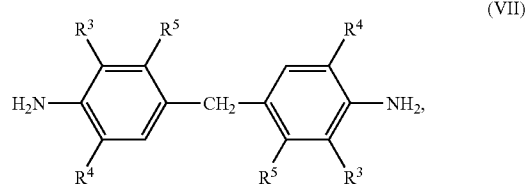

(VII)

in which $R^3$, $R^4$ and $R^5$ are, independently of one another, hydrogen, $C_{1-4}$-alkyl or halogen, and

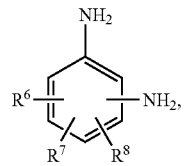

(VIII)

in which $R^6$, $R^7$ and $R^8$ are, independently of one another, hydrogen or $C_{1-4}$-alkyl. These compounds are also known and are in many cases available commercially. Compounds of the formula VII are, for example, used as chain extenders in polyurethanes and those of the formula VIII as amine component in polyureas or as starting materials for the preparation of isocyanates.

The polytriazine-based thermosetting substances obtainable by thermal curing of the mixtures described above, optionally with addition of fillers and/or auxiliaries, are likewise a subject matter of the invention. Fillers and auxiliaries are to be understood as in particular reinforcing materials in the form of fabrics, fibers or particles, colorants or other additives for obtaining particular mechanical, optical, electrical or magnetic properties or for improving the processing characteristics. These fillers and auxiliaries are known to a person skilled in the art.

The use of the thermosetting substances thus obtainable in the preparation of molded items for electronic equipment, aircraft, spacecraft, road vehicles, rail vehicles, watercraft and industrial purposes is an additional subject matter of the invention.

The following exemplary embodiments clarify the invention without a limitation to be seen therein.

EXAMPLES 1-8

Mixtures of cyanates (Primaset® PT 15 from Lonza AG; formula II, $R^2$=H, viscosity 20-30 Pa·s at 80° C.), optionally epoxide (Dow DER 330; formula IV, $R^1$=H, X=—C$(CH_3)_2$—), and amine (Lonzacure® DETDA from Lonza AG, formula VIII, $R^6$=$R^7$=Et, $R^8$=Me, mixture of isomers) were prepared and thermally cured. The glass transition temperature ($T_g$) was determined from the cured test specimens by thermomechanical analysis. The mixing proportions, curing conditions and glass transition temperatures are summarized in the following table 1.

TABLE 1

| Example No. | Epoxide [g] | Cyanate [g] | Amine [g] | $T_g$ [° C.] | Cure temperature [° C.] | Cure time [min] |
|---|---|---|---|---|---|---|
| 1 | — | 100 | 1.0 | 361 | 150 | 60 |
| 2 | — | 100 | 2.5 | 361[1)] | 150 | 60 |
| 3 | — | 100 | 5.0 | 368 | 150 | 60 |
| 4 | — | 100 | 10.0 | 377 | 150 | 60 |
| 5 | 75 | 25 | 2.5 | 375 | 150 | 60 |
| 6 | 75 | 25 | 5.0 | 367 | 150 | 60 |
| 7 | 75 | 25 | 10.0 | 351 | 150 | 60 |
| 8 | 75 | 25 | 10.0 | 378 | 150/200/250 | 180/180/180 |

[1)]after complete curing (2nd measuring cycle)

EXAMPLES 9-12

Processing was carried out as described in the above examples but using Lonzacure® M-CDEA (formula VII, $R^3=R^4=Et$, $R^5=Cl$) as amine. The results are summarized in the following table 2.

TABLE 2

| Example No. | Epoxide [g] | Cyanate [g] | Amine [g] | $T_g$ [° C.] | Cure temperature [° C.] | Cure time [min] |
|---|---|---|---|---|---|---|
| 9 | — | 100 | 5.0 | 384[1)] | 150 | 60 |
| 10 | 75 | 25 | 2.5 | 366 | 150/200/250 | 180/180/180 |
| 11 | 75 | 25 | 5.0 | 362 | 150 | 60 |
| 12 | 75 | 25 | 10.0 | 370 | 150 | 60 |

[1)]after complete curing (2nd measuring cycle)

EXAMPLES 13-16

Processing was carried out as described in examples 9-12 but using the cyanate Primaset® CT 90 (formula II, $R^2=Me$, softening point >60° C.) instead of the cyanate Primaset® PT 15. The results are summarized in the following table 3.

TABLE 3

| Example No. | Epoxide [g] | Cyanate [g] | Amine [g] | $T_g$ [° C.] | Cure temperature [° C.] | Cure time [min] |
|---|---|---|---|---|---|---|
| 13 | 75 | 25 | 5.0 | 369[1)] | 150 | 60 |
| 14 | 75 | 25 | 5.0 | 376 | 150/200/250 | 180/180/180 |
| 15 | 75 | 25 | 10.0 | 372 | 150 | 60 |
| 16 | 75 | 25 | 10.0 | 373 | 150/200/250 | 180/180/180 |

[1)]after complete curing (2nd measuring cycle)

What is claimed is:

1. A curable mixture consisting of:

(a) 10 to 100 percent by weight, in relation to the sum of the components (a) and (c), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate or a mixture formed from the above-mentioned cyanates and/or prepolymers, the bifunctional aromatic cyanate or polyfunctional aromatic cyanate is chosen from the group consisting of the compounds of formula:

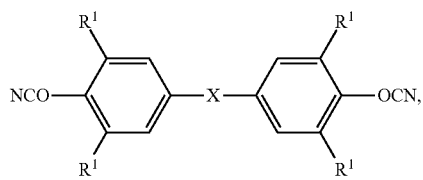
(I)

in which $R^1$ is hydrogen, methyl or bromine and X is selected from the group consisting of —$CH_2$—, —CH($CH_3$)—, —C($CH_3$)$_2$—, —C($CF_3$)$_2$—, —O—, —S—, —$SO_2$—, —C(=O)—, —OC(=O)—, —OC(=O)O—, and

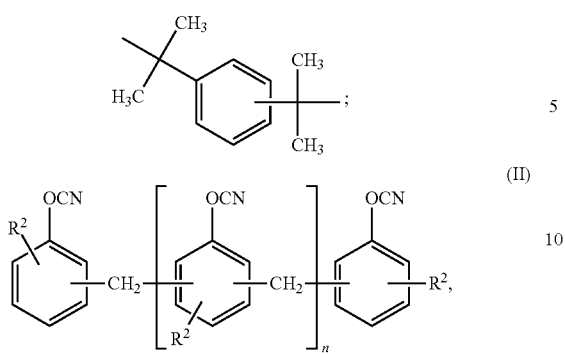

(II)

in which n is a number from 0 to 10 and $R^2$ is hydrogen or methyl; and (III)

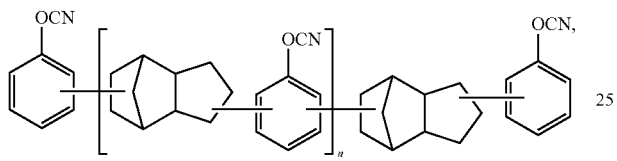

in which n has the above-mentioned meaning;
(b) 0.5 to 30 percent by weight, in relation to the sum of the components (a) and (c), of at least one curing agent that is monofunctional, bifunctional or polyfunctional aromatic amine,
(c) at least one monofunctional, bifunctional or polyfunctional epoxy resin, said epoxy resin present in amount from minimum amount thereof that is curable with components (a) and (b) to 90 percent by weight, in relation to the sum of components (a) and (c), whereby said curable mixture contains epoxy resin (c),
(d) from minimum catalytically effective amount to 5 percent by weight, in relation to the sum of the components (a) and (c) of, at least one catalyst selected from the group consisting of transition metal compounds and boron trihalides, and
(e) optionally at least one member selected from the group consisting of (i) at least one filler, (ii) at least one auxiliary, and (iii) both (i) and (ii).

2. The curable mixture is claimed in claim 1, wherein the catalyst is cobalt acetylacetonate, copper acetylacetonate, zinc octanoate or zinc stearate.

3. The curable mixture as claimed in claim 1, wherein the catalyst is boron trifluoride or boron trichloride.

4. The curable mixture as claimed in claim 1, wherein the aromatic amine is chosen from the group consisting of the compounds of formula:

(VII)

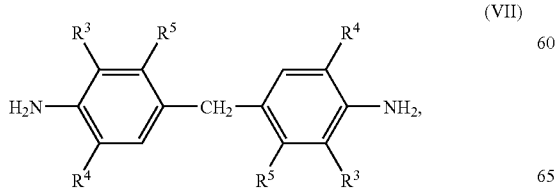

in which $R^3$, $R^4$ and $R^5$ are, independently of one another, hydrogen, $C_{1-4}$-alkyl or halogen, and (VIII)

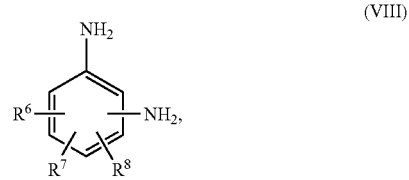

in which $R^6$, $R^7$ and $R^8$ are, independently of one another, hydrogen or $C_{1-4}$-alkyl.

5. A polytriazine-based thermosetting substance, obtainable by thermal curing of the mixture as claimed in claim 1.

6. A process comprising utilizing the thermosetting substance as claimed in claim 5 to prepare molded items for electronic equipment, aircraft, spacecraft, road vehicles, rail vehicles, watercraft and industrial purposes.

7. A curable mixture consisting of:
(a) 10 to 100 percent by weight, in relation to the sum of the components (a) and (c), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate or a mixture formed from the above-mentioned cyanates and/or prepolymers, wherein the bifunctional aromatic cyanate or polyfunctional aromatic cyanate is chosen from the group consisting of the compounds of formula:

(I)

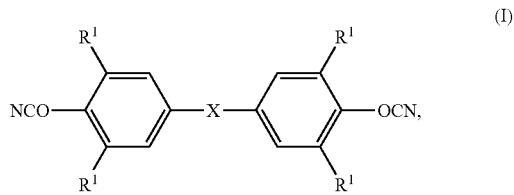

in which $R^1$ is hydrogen, methyl or bromine and X is selected from the group consisting of —CH$_2$—, —CH(CH$_3$)—, —C(CH$_3$)$_2$—, —C(CF$_3$)$_2$—, —O—, —S—, —SO$_2$—, —C(=O)—, —OC(=O)—, —OC(=O)O—, and

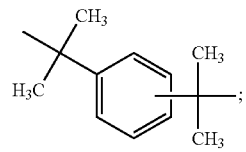

(II)

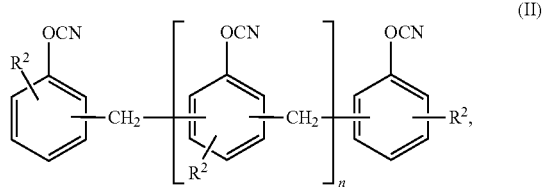

in which n is a number from 0 to 10 and $R^2$ is hydrogen or methyl; and

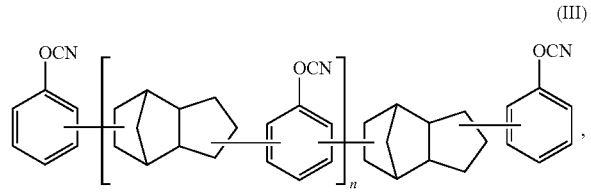

(III)

in which n has the above-mentioned meaning;

and prepolymers formed from one or more of these compounds, (b) 0.5 to 30 percent by weight, in relation to the sum of the components (a) and (c), of at least one curing agent that is monofunctional, bifunctional or polyfunctional aromatic amine, (c) at least one monofunctional, bifunctional or polyfunctional epoxy resin, said epoxy resin present in amount from minimum amount thereof that is curable with components (a) and (b) to 90 percent by weight, in relation to the sum of components (a) and (c), whereby said curable mixture contains epoxy resin (c), (d) from minimum catalytically effective amount to 5 percent by weight, in relation to the sum of the components (a) and (c) of at least one catalyst selected from the group consisting of transition metal compounds and boron trihalides, and (e) optionally at least one member selected from the group consisting of (i) at least one filler, (ii) at least one auxiliary, and (iii) both (i) and (ii), and prepolymers formed from one or more of these compounds.

8. The curable mixture as claimed in claim 7, wherein the epoxy resin is chosen from the group consisting of the compounds of formula:

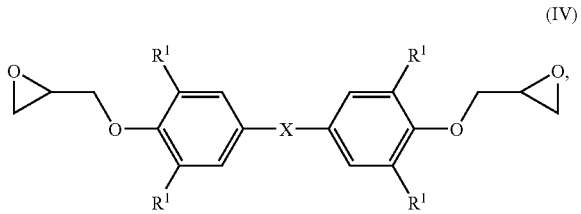

(IV)

in which $R^1$ and X have the meanings mentioned in claim 7, and the corresponding oligomers,

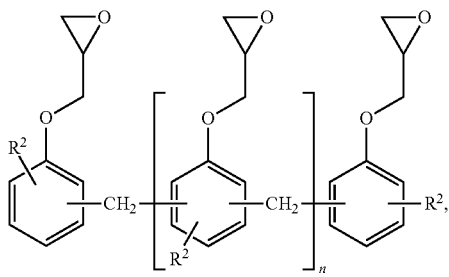

(V)

in which n and $R^2$ have the meanings mentioned in claim 7, and

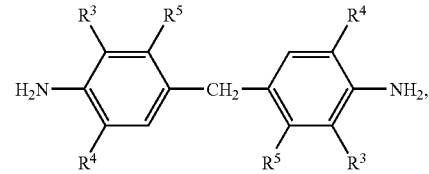

(VI)

in which n has the above-mentioned meaning.

9. The curable mixture as claimed in claim 7, wherein the aromatic amine is chosen from the group consisting of the compounds of formula:

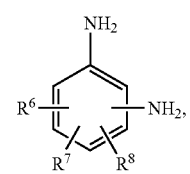

(VII)

in which $R^3$, $R^4$ and $R^5$ are, independently of one another, hydrogen, $C_{1-4}$-alkyl or halogen, and (VIII)

in which $R^6$, $R^7$ and $R^8$ are, independently of one another, hydrogen or $C_{1-4}$-alkyl.

10. A polytriazine-based thermosetting substance, obtainable by thermal curing of the mixture as claimed in claim 7.

11. A process comprising utilizing thermosetting substance as claimed in claim 10 to prepare molded items for electronic equipment, aircraft, spacecraft, road vehicles, rail vehicles, watercraft and industrial purposes.

12. A curable mixture consisting of:

(a) 10 to 100 percent by weight, in relation to the sum of the components (a) and (c), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate having three or more cyanate groups or a mixture formed from the above-mentioned cyanates and/or prepolymers, (b) 0.5 to 30 percent by weight, in relation to the sum of the components (a) and (c), of at least one curing agent that is monofunctional, bifunctional or polyfunctional aromatic amine, the aromatic amine is chosen from the group consisting of the compounds of formula:

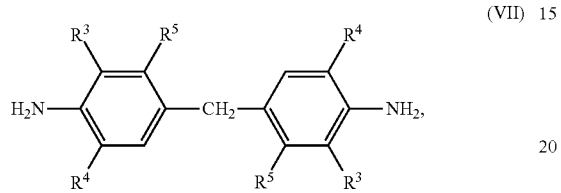

(VII)

in which $R^3$, $R^4$ and $R^5$ are independently of one another hydrogen, $C_{1-4}$-alkyl or halogen, and

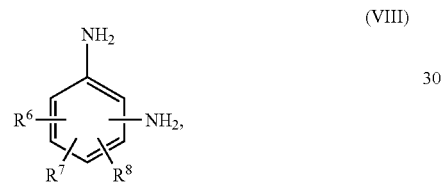

(VIII)

in which $R^6$, $R^7$ and $R^8$ are independently of one another, hydrogen or $C_{1-4}$-alkyl, (c) at least one monofunctional, bifunctional or polyfunctional epoxy resin, said epoxy resin present in amount from minimum amount thereof that is curable with components (a) and (b) to 90 percent by weight, in relation to the sum of components (a) and (c), whereby said curable mixture contains epoxy resin (c), (d) 0 to 5 percent by weight, in relation to the sum of the components (a) and (c), of at least one catalyst from the group consisting of transition metal compounds and boron trihalides, and (e) optionally at least one member selected from the group consisting of (i) at least one filler, (ii) at least one auxiliary, and (iii) both (i) and (ii).

13. A polytriazine-based thermosetting substance, obtainable by thermal curing of the mixture as claimed in claim 12.

14. A process comprising utilizing the thermosetting substance as claimed in claim 13 to prepare molded items for electronic equipment, aircraft, spacecraft, road vehicles, rail vehicles, watercraft and industrial purposes.

15. A polytriazine-based thermosetting substance, obtainable by thermal curing of the mixture as claimed in claim 12.

16. A process comprising utilizing thermosetting substance as claimed in claim 15 to prepare molded items for electronic equipment, aircraft, spacecraft, road vehicles, rail vehicles, watercraft and industrial purposes.

17. A curable mixture consisting of:

(a) 10 to 100 percent by weight, in relation to the sum of the components (a) and (b), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate having three or more cyanate groups or a mixture formed from the above-mentioned cyanates and/or prepolymers, (b) 0 to 90 percent by weight, in relation to the sum of the components (a) and (b), of at least one curing agent that is monofunctional, bifunctional or polyfunctional epoxy resin, (c) 0.5 to 30 percent by weight, in relation to the sum of the components (a) and (b), of at least one monofunctional, bifunctional or polyfunctional aromatic amine, the aromatic amine is chosen from the group consisting of the compounds of formula:

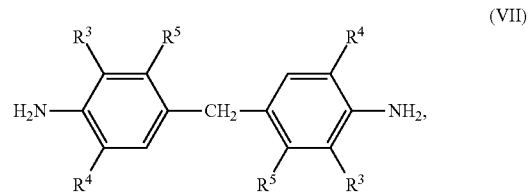

(VII)

in which $R^3$, $R^4$ and $R^5$ are, independently of one another, hydrogen, $C_{1-4}$-alkyl or halogen, and

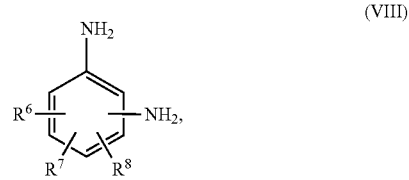

(VIII)

in which $R^6$, $R^7$ and $R^8$ are, independently of one another, hydrogen or $C_{1-4}$-alkyl, (d) from minimum catalytically effective amount to 5 percent by weight, in relation to the sum of the components (a) and (b), of at least one catalyst from the group consisting of transition metal compounds and boron trihalides, (e) optionally at least one member selected from the group consisting of (i) at least one filler, (ii) at least one auxiliary, and (iii) both (i) and (ii).

18. The curable mixture as claimed in claim 17, wherein the catalyst is cobalt acetylacetonate, copper acetylacetonate, zinc octanoate or zinc stearate.

19. The curable mixture as claimed in claim 17, wherein the catalyst is boron trifluoride or boron trichloride.

20. The curable mixture as claimed in claim 17, wherein the epoxy resin is bifunctional and the corresponding oligomers.

21. A polytriazine-based thermosetting substance, obtainable by thermal curing of the mixture as claimed in claim 20.

22. A process comprising utilizing thermosetting substance as claimed in claim 21 to prepare molded items for electronic equipment, aircraft, spacecraft, road vehicles, rail vehicles, watercraft and industrial purposes.

23. A polytriazine-based thermosetting substance, obtainable by thermal curing of the mixture as claimed in claim 17.

24. A process comprising utilizing the thermosetting substance as claimed in claim 23 to prepare molded items for electronic equipment, aircraft, spacecraft, road vehicles, rail vehicles, watercraft and industrial purposes.

25. A polytriazine-based thermosetting substance, obtainable by thermal curing of the mixture as claimed in claim 17.

26. A process comprising utilizing thermosetting substance as claimed in claim 25 to prepare molded items for electronic equipment, aircraft, spacecraft, road vehicles, rail vehicles, watercraft and industrial purposes.

27. A curable mixture consisting of:
(a) 10 to 100 percent by weight, in relation to the sum of the components (a) and (c), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate or a mixture formed from the above-mentioned cyanates and/or prepolymers, wherein the bifunctional aromatic cyanate or polyfunctional aromatic cyanate is chosen from the group consisting of the compounds of formula:

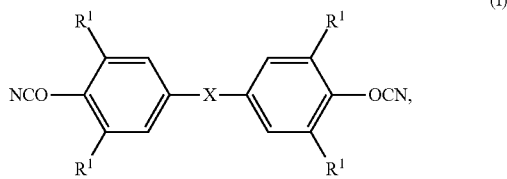

(I)

in which $R^1$ is hydrogen, methyl or bromine and X is selected from the group consisting of —CH$_2$—, —CH(CH$_3$)—, —C(CH$_3$)$_2$—, —C(CF$_3$)$_2$—, —O—, —S—, —SO$_2$—, —C(=O)—, —OC(=O)—, —OC(=O)O—, and

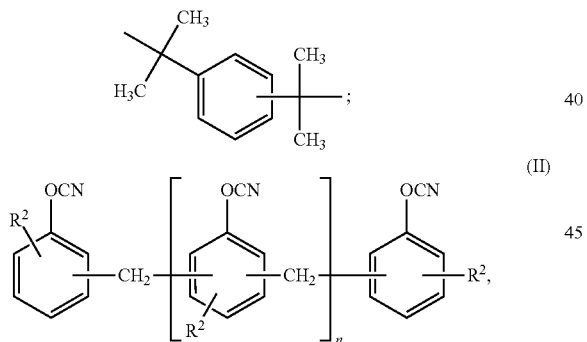

(II)

in which n is a number from 0 to 10 and $R^2$ is hydrogen or methyl;
and (III)

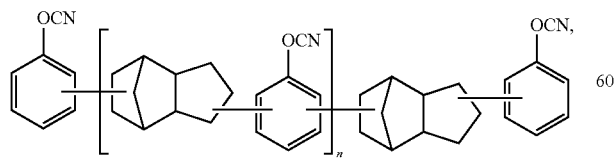

in which n has the above-mentioned meaning;
and prepolymers formed from one or more of these compounds, (b) of at least one curing agent that is monofunctional, bifunctional or polyfunctional epoxy resin,
(c) 0.5 to 30 percent by weight, in relation to the sum of the components (a) and (b), of at least one monofunctional, bifunctional or polyfunctional aromatic amine,
(d) from minimum catalytically effective amount to 5 percent by weight, in relation to the sum of the components (a) and (b), of at least one catalyst from the group consisting of transition metal compounds and boron trihalides, and
(e) optionally at least one member selected from the group consisting of (i) at least one filler, (ii) at least one auxiliary, and (iii) both (i) and (ii).

28. A polytriazine-based thermosetting substance, obtainable by thermal curing of the mixture as claimed in claim 27.

29. A process comprising utilizing thermosetting substance as claimed in claim 28 to prepare molded items for electronic equipment, aircraft, spacecraft, road vehicles, rail vehicles, watercraft and industrial purposes.

30. A curable mixture consisting of:
(a) 10 to 100 percent by weight, in relation to the sum of the components (a) and (c), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate having three or more cyanate groups or a mixture formed from the above-mentioned cyanates and/or prepolymers,
(b) 0.5 to 30 percent by weight, in relation to the sum of the components (a) and (c), of at least one curing agent that is monofunctional, bifunctional or polyfunctional aromatic amine, chosen from the group consisting of the compounds of formula:

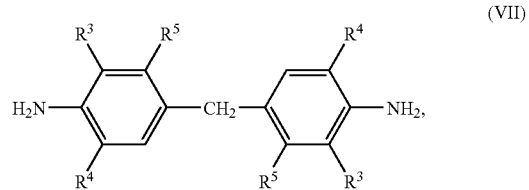

(VII)

in which $R^3$, $R^4$ and $R^5$ are, independently of one another, hydrogen, $C_{1-4}$-alkyl or halogen, and

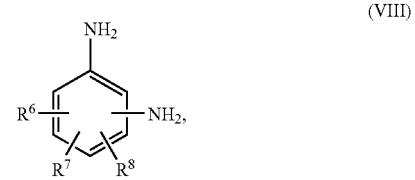

(VIII)

in which $R^6$, $R^7$, and $R^8$ are, independently of one another, hydrogen or $C_{1-4}$-alkyl,
(c) at least one monofunctional, bifunctional or polyfunctional epoxy resin, said epoxy resin present in amount from minimum amount thereof that is curable with components (a) and (b) to 90 percent by weight, in relation to the sum of components (a) and (c), whereby said curable mixture contains epoxy resin (c), the epoxy resin is chosen from the group consisting of the compounds of formula:

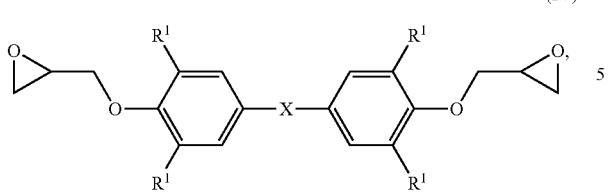

in which $R^1$ is hydrogen, methyl or bromine and X is selected from the group consisting of —$CH_2$—, —$CH(CH_3)$—, —$C(CH_3)_2$—, —$C(CF_3)_2$—, —O—, —S—, —$SO_2$—, —OC(=O)—, —OC(=O)O—, and

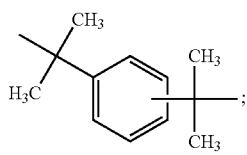

and the corresponding oligomers,

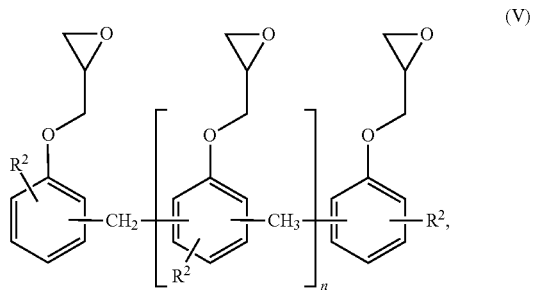

in which n is a number from 0 to 10 and $R^2$ is hydrogen or methyl; and

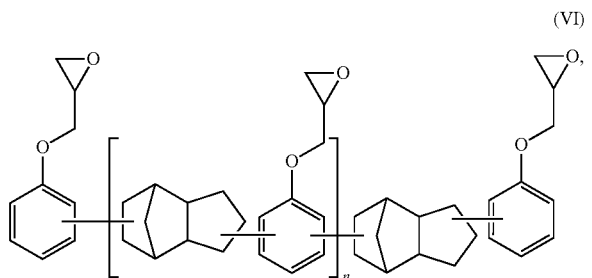

in which n has the above-mentioned meaning, (d) 0 to 5 percent by weight, in relation to the sum of the components (a) and (c), of at least one catalyst from the group consisting of transition metal compounds and boron trihalides, and (e) optionally at least one member selected from the group consisting of (i) at least one filler, (ii) at least one auxiliary, and (iii) both (i) and (ii).

31. A curable mixture consisting of:

(a) 10 to 100 percent by weight, in relation to the sum of the components (a) and (b), of at least one bifunctional aromatic cyanate having two cyanate groups or polyfunctional aromatic cyanate having three or more cyanate groups or a prepolymer formed from at least one bifunctional aromatic cyanate having two cyanate groups or polyfunctional aromatic cyanate having three or more cyanate groups or a mixture formed from the above-mentioned cyanates and/or prepolymers, (b) 0 to 90 percent by weight, in relation to the sum of the components (a) and (b), of at least one curing agent that is monofunctional, bifunctional or polyfunctional epoxy resin, (c) 0.5 to 30 percent by weight, in relation to the sum of the components (a) and (b), of at least one monofunctional, bifunctional or polyfunctional aromatic amine, (d) from minimum catalytically effective amount to 5 percent by weight, in relation to the sum of the components (a) and (b), of at least one catalyst from the group consisting of boron trifluoride or boron trichloride, and (e) optionally at least one member selected from the group consisting of (i) at least one filler, (ii) at least one auxiliary, and (iii) both (i) and (ii).

32. A polytriazine-based thermosetting substance, obtainable by thermal curing of the mixture as claimed in claim 31.

33. A process comprising utilizing thermosetting substance as claimed in claim 32 to prepare molded items for electronic equipment, aircraft, spacecraft, road vehicles, rail vehicles, watercraft and industrial purposes.

* * * * *